US008690022B2

(12) United States Patent
Lee

(10) Patent No.: US 8,690,022 B2
(45) Date of Patent: Apr. 8, 2014

(54) BUTTON-SLIDING-TYPE OPENING/CLOSING DEVICE FOR A COSMETIC CONTAINER

(75) Inventor: Young Joo Lee, Anyang-si (KR)

(73) Assignees: Young Joo Lee, Anyang-si, Gyeonggi-do (KR); Jae Kwang Hwang, Seoul (KR)

( * ) Notice: Subject to any disclaimer, the term of this patent is extended or adjusted under 35 U.S.C. 154(b) by 0 days.

(21) Appl. No.: 13/384,132

(22) PCT Filed: Mar. 18, 2010

(86) PCT No.: PCT/KR2010/001665

§ 371 (c)(1), (2), (4) Date: Jan. 13, 2012

(87) PCT Pub. No.: WO2011/007950

PCT Pub. Date: Jan. 20, 2011

(65) Prior Publication Data

US 2012/0111896 A1 May 10, 2012

(30) Foreign Application Priority Data

Jul. 15, 2009 (KR) ........................ 10-2009-0064307

(51) Int. Cl.

*B65D 88/54* (2006.01)
*G01F 11/00* (2006.01)
*B65D 83/00* (2006.01)
*B67D 3/00* (2006.01)
*B67D 7/06* (2010.01)

(52) U.S. Cl.

USPC .................. 222/321.6; 222/321.3; 222/321.7; 222/402.12; 222/532; 222/536

(58) Field of Classification Search

USPC ............. 222/321.3, 321.6, 321.7, 321.9, 380, 222/402.12, 571, 402.13, 531, 532, 536, 222/537

See application file for complete search history.

(56) References Cited

U.S. PATENT DOCUMENTS

| | | | | |
|---|---|---|---|---|
| 3,386,631 | A * | 6/1968 | Kotuby | 222/402.11 |
| 3,429,483 | A * | 2/1969 | Micallef | 222/153.11 |
| 3,734,353 | A * | 5/1973 | McIlhenny | 222/153.11 |
| 6,053,374 | A * | 4/2000 | Santagiuliana | 222/534 |
| 6,398,082 | B2 * | 6/2002 | Clark et al. | 222/402.11 |
| 6,478,194 | B2 * | 11/2002 | Haglund et al. | 222/153.14 |
| 8,152,026 | B2 * | 4/2012 | Ki | 222/153.13 |
| 2007/0194050 | A1 * | 8/2007 | Krampen et al. | 222/153.13 |

* cited by examiner

*Primary Examiner* — Paul R Durand
*Assistant Examiner* — Matthew Lembo
(74) *Attorney, Agent, or Firm* — Novick, Kim & Lee, PLLC; Jae Youn Kim

(57) ABSTRACT

The present invention relates to a button-sliding-type opening/closing device for a cosmetic container consisting of a vessel for storing cosmetics in a liquid or gel state, and a discharge pump coupled to a top inner portion of the vessel for discharging cosmetics by applying external pressure thereto, wherein the button-sliding-type opening/closing device comprises: a shoulder (20) coupled to the top portion of the vessel (10); a button body (30) inserted into the shoulder (20) and upwardly and downwardly movable; and a button (40) slidably coupled to a top surface of the button body (30), for opening and closing a cosmetic pumping hole (31) in the button body (30), as well as for preventing the button body (30) from being pressed and actuated.

5 Claims, 8 Drawing Sheets

BUTTON-SLIDING-TYPE OPENING/CLOSING DEVICE FOR A COSMETIC CONTAINER

BACKGROUND (a) Technical Field

The present invention relates to an open and close apparatus of a button sliding type for a liquid instrument, and more particularly, to an open and close apparatus of a button sliding type for a liquid instrument which is opened and closed by sliding a pump button provided on the liquid instrument without separating a lid when using the liquid instrument.

(b) Background Art

Generally, the contents is received in an instrument main body and in order to avoid a spoilage of the contents due to an air contact a discharger is provided on an upper end thereof for discharging a small amount of the contents while being connected to the instrument main body. Specially, the discharger has been configured as a pump type discharging structure for discharging easily the contents so that a user presses a knob for the contents to be pumped and discharged automatically.

In general, in the pump type liquid instrument, a separate compression pump is provided on an instrument body and a separate piston is inserted inside the instrument, and a pressure difference is produced inside the instrument, which is caused from the compressed pump, and the contents is discharged and the piston rises to as amount as the discharged space to push upward the contents.

Furthermore, in the liquid instrument configured as the pump type discharging structure, a knob of a pump device operation unit for discharging a predetermined amount of the contents in a liquid state or gel phase is compressed unintentionally to discharge and waste the contents. Accordingly, a whole pump including a nozzle is covered with a lid and the lid is opened when using the instrument for the nozzle to be exposed.

However, the lid is connected in a screw type manner so that the lid is opened and closed through its rotation and thus the lid has to be rotated inconveniently at several times for opening and closing it depending on the number of threads, and further the opened lid may be mishandled or lost, or dropped to be damaged.

Further, in Korean Utility Model Application No. 2003-35413 and Korean Utility Model Application No. 2003-38063, a liquid instrument of a nozzle appearing type has been disclosed, in which the nozzle is raised to be exposed to the outside of the lid by rotating a body or the lid while not separating the lid, and the nozzle is lowered to be concealed to the inside of the lid by reverse-rotating the body or the lid so that when not using the liquid instrument, a nozzle button is avoid being pressed intentionally for the contents to be discharged.

In the liquid instrument as configured in the forgoing, when the nozzle is compressed from an upper side to a lower side, the contents is discharged sideward. Here, since the contents is injected by exposing the nozzle over the lid, even if injection power is not great, a pumping force is great in an initial state of compressing the nozzle and thus the contents is injected to a relatively long distance, however, at a final state of compressing the nozzle the pumping force is small and thus the contents is dropped on the lid wherein the contents dropped on the lid is emerged into a groove between the lid and the nozzle to be spoiled, or the contents is coated with various external substances to contaminate the surroundings.

SUMMARY OF THE DISCLOSURE

The present invention has been made in an effort to solve the above-described drawbacks associated with prior art, and an object of the present invention relates to provide to an open and close apparatus of a button sliding type for a liquid instrument which is opened and closed by sliding a pump button provided on the liquid instrument without separating a lid when using the liquid instrument.

In order to achieve the above object of the present invention, an open and close apparatus of a button sling type for a contents instrument including a container receiving the contents in a liquid state or gel phase and a discharging pump connected to the upper inner part of the container for discharging the contents comprising: a shoulder connected to an upper part of the container; a button body inserted into the shoulder and movable vertically; a button which is connected slidingly to an upper surface of the button body, and closes and opens a contents pumping hole of the button body and allows the button body not to be compressed.

The button body a lower surface of which is opened and an upper surface of which is concaved comprises: a sliding hole which is formed symmetrically on both sides of the upper surface and into which a plurality of legs of the button are inserted to be slid; a side wall which is formed on the respective one side of the sliding hole and on a lower surface of which the stumbling protrusion at a leg portion lower end of the button is stumbled-connected; and a contents pumping hole which is formed a center of the upper surface and is communicated with a discharging hole of the discharging pump.

Further, the open and close apparatus of a button sling type for a contents instrument further comprises a guide cap for guiding a sliding of the button on an upper surface and front part of the button body.

Meanwhile, the open and close apparatus of a button sling type for a contents instrument further comprises: a sliding limitation hole on a peripheral region of the contents pumping hole of the button body into which a lower hole protruding to a lower part of the button is inserted for the button not to be excessively slid.

Here, an upper surface of the button is shaped as a concaved surface, corresponding to the upper surface of the button body and further a leg portion protruding to be inserted respectively into the sliding hole of the button body is formed on a lower surface of the button wherein the leg portion comprises: a guide protrusion which is guided along the sliding hole;

a leg protruding respectively downward at a rear end of the guide protrusion; a stumbling protrusion to be hung on a side wall lower end of the sliding hole at a distal end of the leg; a lower hole which is protruded downward at a location biased rearward on a center line of the sliding direction as a lower surface to correspond to the contents pumping hole of the button body; and a front lower surface discharging hole which is communicated with the lower hole and discharge the contents to a front side lower surface of the button.

Further, the shoulder comprises: a screw connection portion to be screw-connected to an upper outer peripheral surface of the container at a lower part thereof; a cylindrical protrusion protruding upward the screw connection portion, having smaller inner diameter than that of the screw connection portion;

an inner protrusion protruding in a circular form and leaving a groove spaced at a predetermined distance from the inner peripheral surface of the cylindrical protrusion; and a stepped surface formed at a low level and leaving a hollow space on a center of the inner peripheral surface of the inner protrusion.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below.

Figure 1:
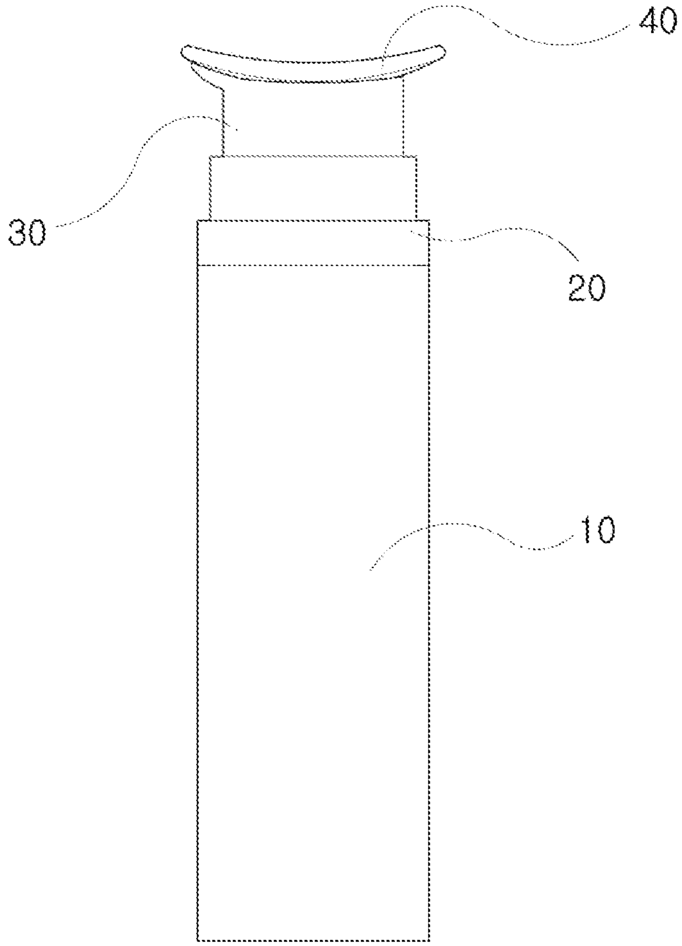
FIG. 1 is a side view showing a state in which a button of a liquid instrument according to the present invention is closed.
Figure 2:
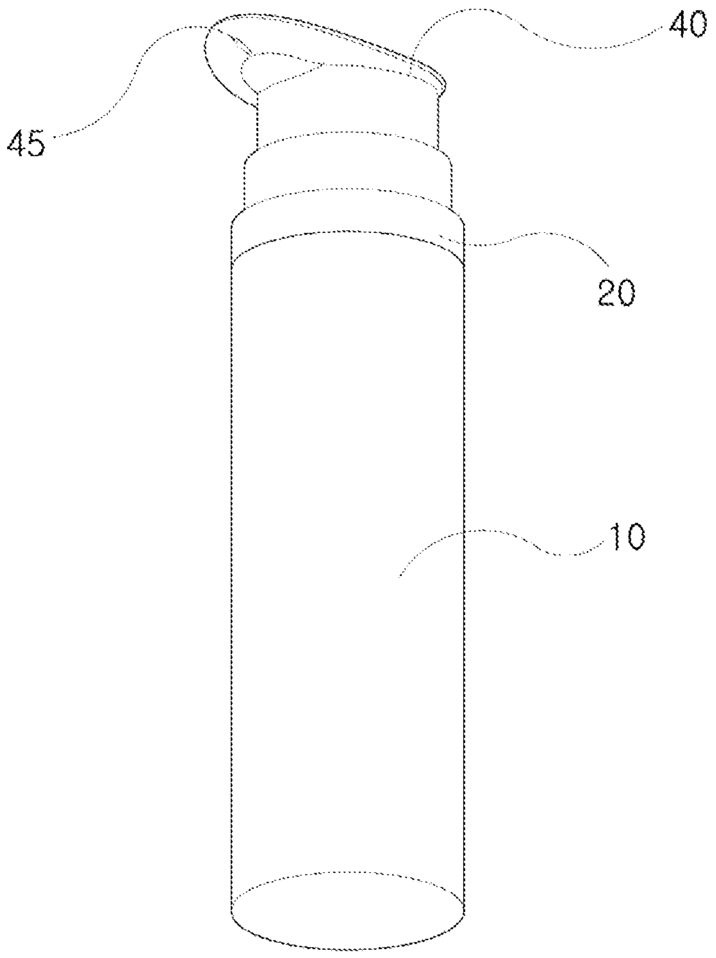
FIG. 2 is a perspective view showing a state in which a button of a liquid instrument according to the present invention is closed.
Figure 3:
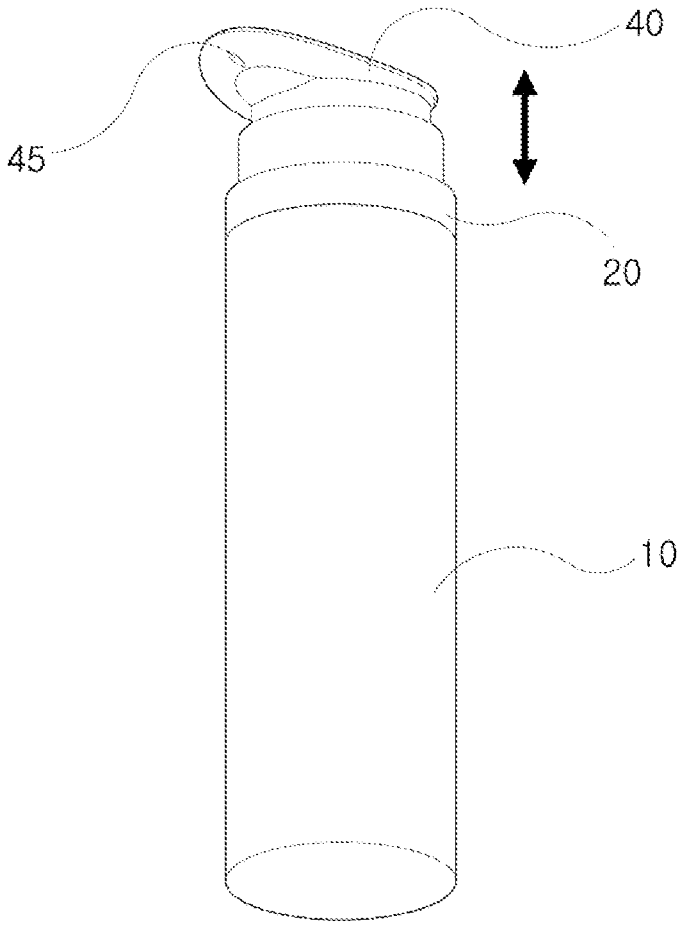
FIG. 3 is a perspective view showing a button of a liquid instrument being up-downed to be pumped in a state in which a button of a liquid instrument according to the present invention is opened.
Figure 4:
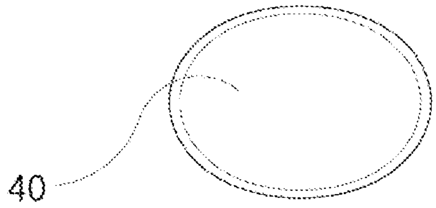
FIGS. 4 to 7 are a plain view, a side view and a perspective view, respectively, showing the button of the liquid instrument according to the present invention.
Figure 5:
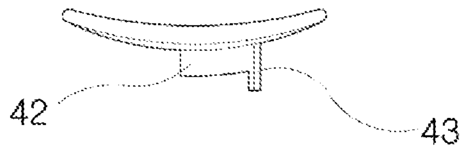
Figure 6:
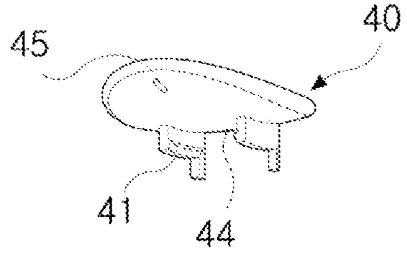
Figure 7:
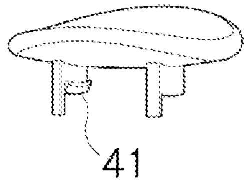
Figure 8:
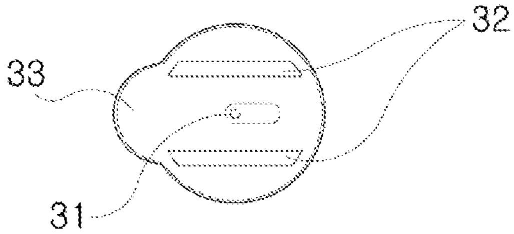
FIGS. 8 to 11 are a plain view, a side view and a perspective view, respectively, showing a button body of the liquid instrument according to the present invention.
Figure 9:
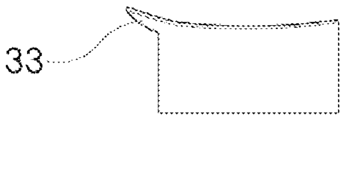
Figure 10:
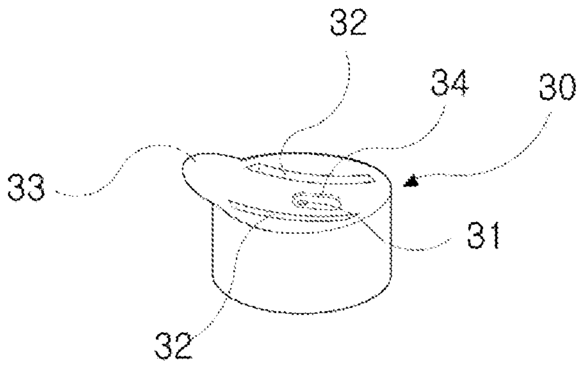
Figure 11:
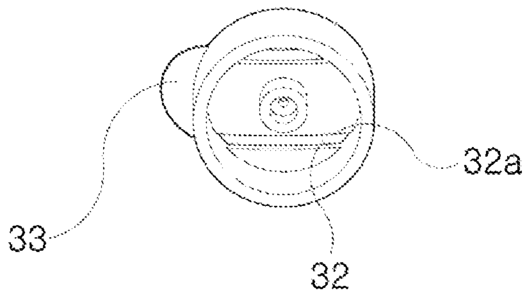
Figure 12:
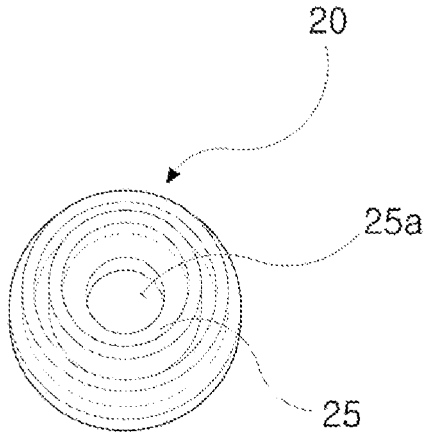
FIGS. 12 to 15 are a plain view, a side view and a perspective view, respectively, showing a shoulder of the liquid instrument according to the present invention.
Figure 13:
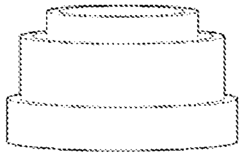
Figure 14:
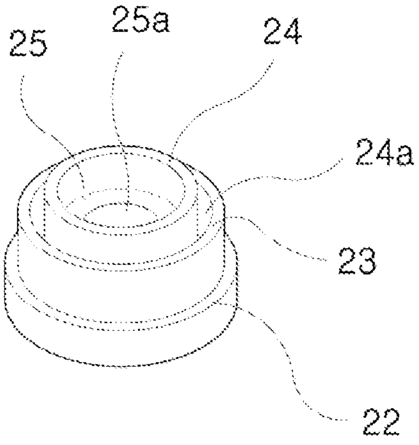
Figure 15:
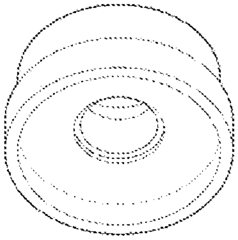
Figure 16:
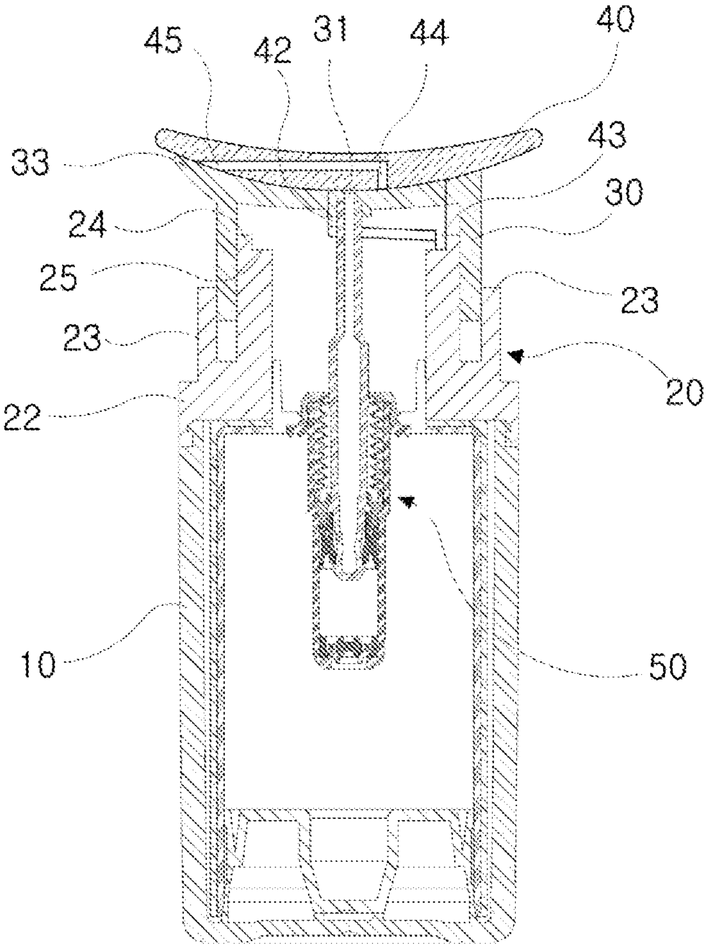
FIGS. 16 and 17 are cross-sectional views showing an opening state and a closing state of the button, respectively, of the liquid instrument according to the present invention.
Figure 17:
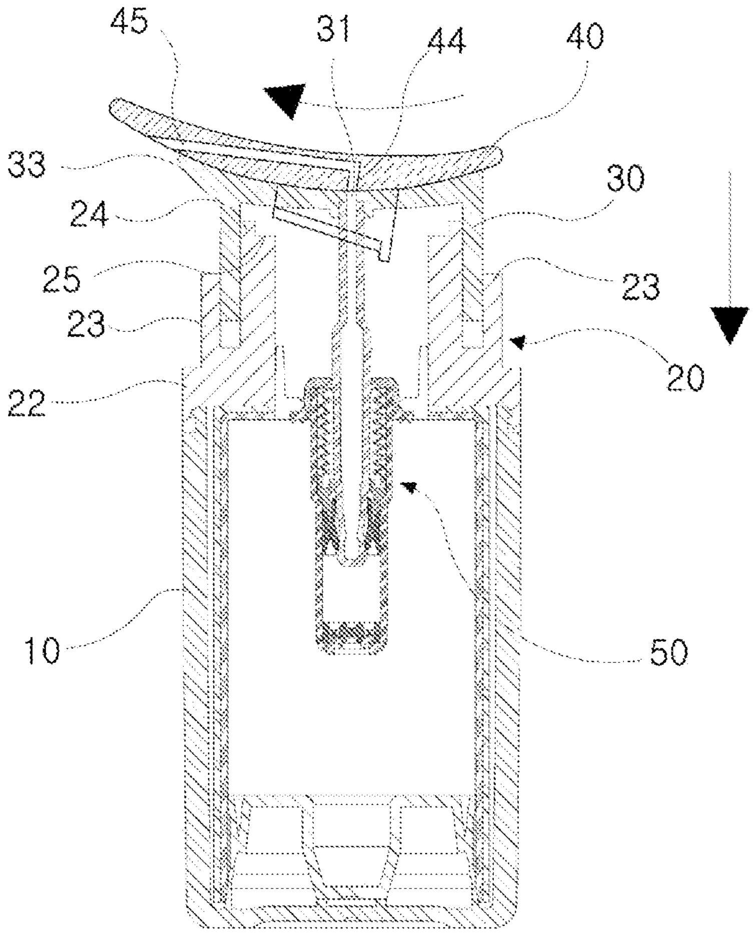

FIG. 1 is a side view showing a state in which a button of a liquid instrument according to the present invention is closed, FIG. 2 is a perspective view showing a state in which a button of a liquid instrument according to the present invention is closed, FIG. 3 is a perspective view showing a button of a liquid instrument being up-downed to be pumped in a state in which a button of a liquid instrument according to the present invention is opened, FIGS. 4 to 7 are a plain view, a side view and a perspective view, respectively, showing the button of the liquid instrument according to the present invention, FIGS. 8 to 11 are a plain view, a side view and a perspective view, respectively, showing a button body of the liquid instrument according to the present invention, FIGS. 12 to 15 are a plain view, a side view and a perspective view, respectively, showing a shoulder of the liquid instrument according to the present invention, and FIGS. 16 and 17 are cross-sectional views showing an opening state and a closing state of the button, respectively, of the liquid instrument according to the present invention.

As shown in the drawings, a liquid instrument of the present invention comprising a container 10 for receiving the contents in a liquid state or a gel phase, and a discharging pump 50 which is connected to the upper inside of the container 10 and discharges the contents through an external pressure, may include a shoulder 20 connected to an upper part of the container 10, a button body 30 inserted into the shoulder 20 and movable vertically, and a button 40 which is connected to an upper surface of the button body 30 and allows the button body 30 not to be operated while opening and closing the contents pumping hole 31 of the button body 30.

The button body 30 is configured such that its lower surface is opened and its upper surface is concaved, and further a sliding hole 32 formed symmetrically on both sides so that a plurality of leg portions of the button 40 are inserted and slid therein. Further, a side wall 32*a* is formed on the respective side of the sliding hole 32 so that the side wall is stumbled-connected to a stumbling protrusion 42 formed on a lower end of the leg portion of the button 40 and a contents pumping hole 31 is formed on a middle of the upper surface.

Here, a guide cap 33 is formed forward on the upper surface of the button body 30 for guiding the sliding of the button 40.

A sliding limitation groove 34 is formed on a peripheral region of the contents pumping hole 31 of the button body 30 so that a lower hole 44 is inserted to a lower part of the button 40 for limiting the button not to slide excessively.

The upper surface of the button 40 is shaped as the same concave surface as the upper surface of the button body 30 and the leg portions are formed on the lower surface of the button to be inserted, respectively into the sliding hole 32 of the button body 30.

The leg portions includes a guide protrusion 42 which is guided along the sliding hole 32, a leg 43 protruding downward on a rear end of the guide protrusion 42, and a stumbling protrusion 41 to be hung over the side wall lower end of the sliding hole 31 at the distal end of the leg 43.

A lower hole 44 protruding downward is formed on a center line in a sliding direction on a lower surface of the button 40 so that when the button 40 is slid forward totally, that is, the button is biased rearward, the lower hole corresponds to the contents pumping hole 31 of the button body 30. Further, a front lower surface discharging hole 45 for discharging the contents is formed on a front side lower surface of the button 40 to be communicated with the lower hole 44.

The shoulder 20 includes a screw connection portion to be screw-connected to the upper outer peripheral surface of the container 10 on its lower part, a cylindrical protrusion 23 protruding upward and having a smaller inner diameter than that of the screw connection portion 22, an inner protrusion 24 protruding as a cylinder form and forming a groove 24*a* spaced at a predetermined distance from the inner peripheral surface of the cylinder protrusion 23, and a stepped surface 25 at a lower level, forming a hollow space 25*a* on an inner peripheral surface of the inner protrusion 24 on a center.

Here, the leg 43 of the button 40 is placed on the stepped surface 25 when the button is locked, and when the button is slid forward, the leg 43 is placed on the hollow space 25*a* at a center of the stepped surface 25 for the button body 30 to be compressed.

With respect to an operation of the open and close apparatus of a button sliding type of a contents instrument according to the present invention as configured in the forgoing, firstly, when the button 40 is placed at a center of the container 10, as shown in FIG. 1, the button body 30, together with the button 40, is not compressed, as shown in FIG. 16. In order to open the contents instrument for discharging the contents through the discharging hole 45, firstly, an upper surface of the button is slid by using a finger, the guide protrusion 42 of the button 40 is moved forward within the sliding hole 32 of the button body 30 and the discharging hole 45 is protruded toward a front lower end. At this time, the lower hole 44 corresponds to the contents pumping hole 31 of the button body 30 and at the same time the leg 43 of the button 40 is placed on the hollow space 25*a* of the stepped surface 25 of the shoulder 20 at a center, thereby compressing the button body 30.

In this state, the button 40 is compressed downward, the button body 30 descends to operate the discharging pump 50, thereby pumping the contents.

After pumping the contents, when the button 40 is slid back rearward to be placed on a center (a state in which the button is not further slid by the sliding limitation groove 34 on the upper surface of the button body 30), the leg 43 of the button 40 is placed on the stepped surface 25 of the shoulder 20 and at the same time the lower hole 44 of the button 40 is departed from the contents pumping hole 31 of the button body 30. In this state, even in case of the button 40 being pushed downward, the button is not to be compressed due to the stepped surface 25 of the shoulder 20.

According to the open and close apparatus of a button sliding type for a liquid instrument as configured in the foregoing, the lid is opened and closed by sliding a pump button provided on the liquid instrument without separating a lid when using the liquid instrument so that a separate lid is not prepared to configured simply and save manufacturing cost, and further its appearance is beautiful due to a simple structure and functionality is improved.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. An open and close apparatus of a button sling type for a contents instrument, the apparatus comprising:
- a container receiving contents in a liquid state or gel phase;
- a discharging pump connected to an inner upper part of the container for discharging the contents;
- a shoulder connected to an exterior upper part of the container;
- a button body inserted into the shoulder and movable vertically;
- a button which is slidably connected to an upper surface of the button body, and is movable in the backward and forward directions with respect to the button body and thereby closes and opens a contents pumping hole of the button body and, wherein the botton is incapable of moving vertically downward when in a retracted, closed position; and
- a guide cap for guiding a sliding of the button on an upper surface and front part of the button body and configured to uncover a front lower surface discharging hole of the button when the button is moved forward and upward.

2. An open and close apparatus of a button sling type for a contents instrument, the apparatus comprising:
- a container receiving contents in a liquid state or gel phase;
- a discharging pump connected to an inner upper part of the container for discharging the contents;
- a shoulder connected to an exterior upper part of the container;
- a button body inserted into the shoulder and movable vertically; and
- a button which is slidably connected to an upper surface of the button body, and is movable in the backward and forward directions with respect to the button body and thereby closes and opens a contents pumping hole of the button body and, wherein the button is incapable of moving vertically downward when in a retracted, closed postion, wherein the button body has an opened lower surface and a concave-curved upper surface, and the button body further comprises:
- a pair of sliding holes formed symmetrically on the upper surface of the button body and which is configured to receive a plurality of leg units of the button such that the plurality of leg units of the button slide thereon;
- a side wall which is disposed on each side of each of the pair of sliding holes and is configured to be connected with a stumbling protrusion located on a lower portion of the leg units; and
- a guide cap for guiding a sliding of the button on an upper surface and front part of the button body and configured to uncover a front lower surface discharging hole of the button when the button is moved forward and upward, and wherein the contents pumping hole which is formed in a center of the upper surface of the button body and corresponds to a discharging hole of the discharging pump.

3. The apparatus of claim 2, further comprising:
- a sliding limitation hole on a peripheral region of the contents pumping hole of the button body, wherein a lower hole protruding to a lower part of the button is inserted in the sliding limitation hole such that the button is not excessively slid.

4. The apparatus of of claim 2, wherein an upper surface of the button has a concaved curved surface shape corresponding to the upper surface of the button body, wherein the plurality of leg units are formed on a lower surface of the button and inserted respectively into the pair of sliding holes of the button body, and wherein each of the plurality of leg units comprises:
- a guide protrusion which is guided along one of the pair of the sliding holes;
- a leg protruding respectively downward at a rear end of the guide protrusion;
- the stumbling protrusion engaging the side wall of the button body and located on the lower portion of each of the leg units;
- a lower hole facing downward and positioned behind a center line of the pumping hole in a locked position; and
- a front lower surface discharging hole which is communicated with the lower hole and discharge the contents to a front side lower surface of the button.

5. The apparatus of claim 2, wherein the shoulder comprises:
- a screw connection portion to be screw-connected to an upper outer peripheral surface of the container at a lower part thereof;
- a cylindrical protrusion protruding upward the screw connection portion, having smaller inner diameter than that of the screw connection portion;
- an inner protrusion protruding in a circular form and leaving a groove spaced at a predetermined distance from the inner peripheral surface of the cylindrical protrusion, the groove being defined by the cylindrical protrusion and the inner protrusion and being configured to receive the button body; and a stepped surface formed at a low level and leaving a hollow space on a center of the inner peripheral surface of the inner protrusion.

* * * * *